United States Patent [19]

Schulze

[11] 4,020,253

[45] Apr. 26, 1977

[54] STRESS-CRACK RESISTANT ETHYLENE-PERHALOETHYLENE COPOLYMERS

[75] Inventor: Stephen R. Schulze, Gillette, N.J.

[73] Assignee: Allied Chemical Corporation, Morris Township, N.J.

[22] Filed: Apr. 2, 1975

[21] Appl. No.: 564,232

[52] U.S. Cl. .............................. 526/89; 260/878 R; 260/897 C; 428/461; 526/206; 526/231; 526/249; 526/255

[51] Int. Cl.² ..................................... C08F 210/02

[58] Field of Search ............... 260/87.5 B, 87.5 C, 260/878 R, 897 C; 526/249, 255, 89, 206

[56] References Cited

UNITED STATES PATENTS

| | | | |
|---|---|---|---|
| 3,371,076 | 2/1968 | Ragazzini et al. | 260/87.5 B |
| 3,906,060 | 9/1975 | Mattiussi et al. | 260/897 C |

Primary Examiner—Harry Wong, Jr.
Attorney, Agent, or Firm—Roger H. Criss; Michael S. Jarosz

[57] ABSTRACT

Stress-crack resistant copolymers of from about 40 to 60 mol percent ethylene and 60 to 40 percent of a halogenated comonomer selected from the group consisting of tetrafluoroethylene and chlorotrifluoroethylene and mixtures thereof and containing high and low molecular weight components such that:

$$\sum_{i=1}^{\infty} X_i \overline{M}w_i = f \cdot \overline{M}w, \text{ and} \quad (1)$$

$$0.02 \leq \frac{\overline{M}w \sum_{i=1}^{\infty} X_i}{\sum_{i=1}^{\infty} X_i \overline{M}w_i} \leq 0.6, \quad (2)$$

wherein
$X_i$ represents the weight fraction of each high molecular weight component $i$;
$\overline{M}w$ represents the weight-average molecular weight of the copolymer;
$\overline{M}w_i$ represents the weight-average molecular weight of each component $i$;

$$\overline{M}w = \sum_{i=1}^{\infty} X_i \overline{M}w_i + \sum_{j=1}^{\infty} X_j \overline{M}w_j$$

wherein
$X_j$ represents the weight fraction of each low molecular weight component $j$, and
$\overline{M}w_j$ represents the weight-average molecular weight of each component $j$, and
$0.1 \leq f \leq 0.95$.

23 Claims, 1 Drawing Figure

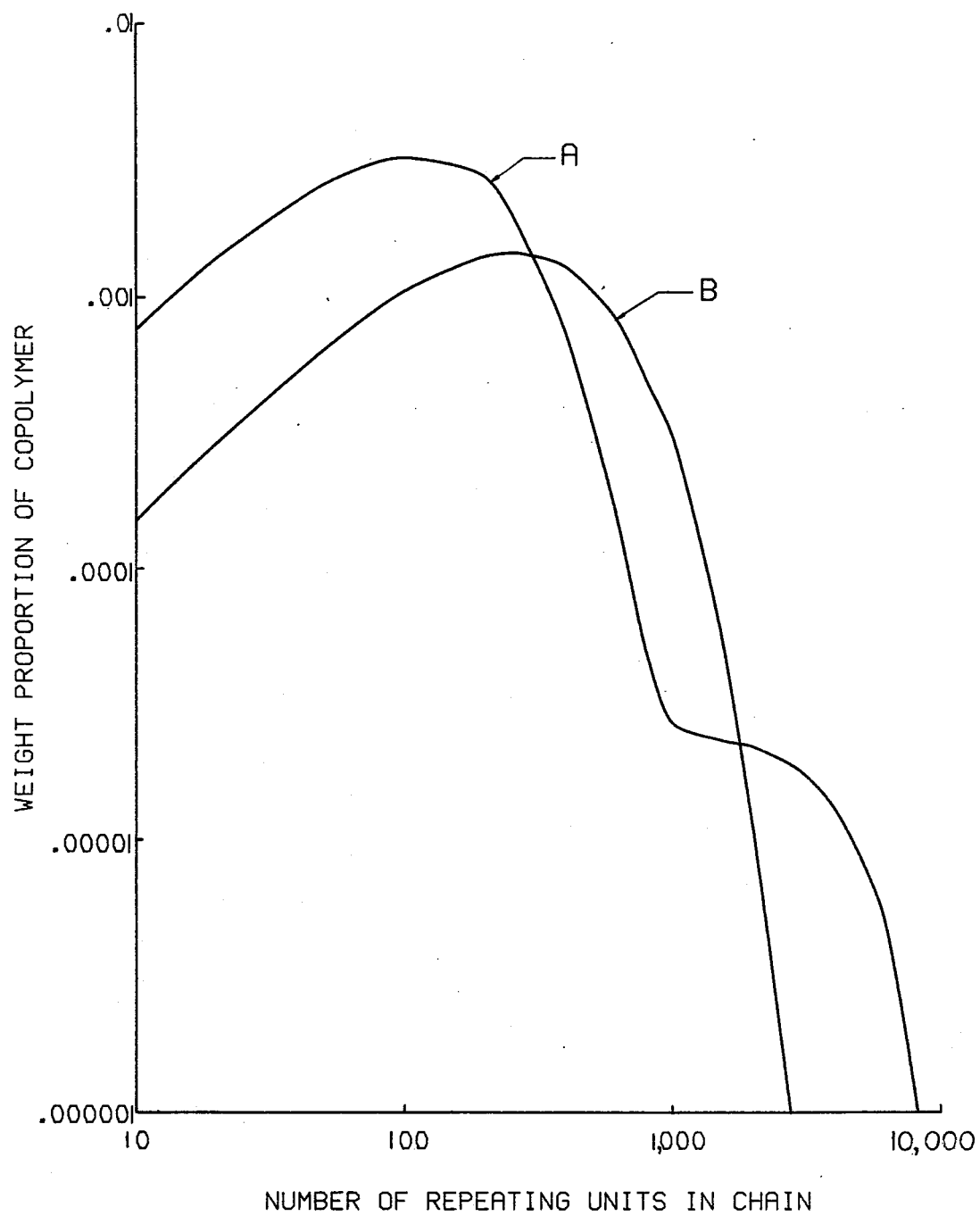

STRESS-CRACK RESISTANT ETHYLENE-PERHALOETHYLENE COPOLYMERS

BACKGROUND OF THE INVENTION

1. Field of the Invention

This invention relates to stress-crack resistant ethyleneperhaloethylene copolymers, particularly copolymers of 40 to 60 mol percent of ethylene with correspondingly from 40 to 60 mol percent of chlorotrifluoroethylene, tetrafluoroethylene or mixtures thereof.

2. Description of the Prior Art

Copolymers of about 40 to about 60 mol percent of ethylene with correspondingly from about 60 to about 40 mol percent chlorotrifluoroethylene, tetrafluoroethylene or mixtures thereof are known in the art and are disclosed, for example, in U.S. Pat. No. 3,847,881 issued in 1974 to Mueller et al. While such copolymers have high melting points, generally in the order of about 200° C, their use at temperatures above about 150° C has been severely restricted due to their tendency to thermal stress-crack at such temperatures. At such temperatures, the copolymers exhibit cracks under tensile stresses appreciably below the limits of their shortterm strength, especially when powder coated onto metal substrates.

To overcome the thermal stress-cracking tendency of ethylene-chlorotrifluoroethylene and ethylene/tetrafluoroethylene copolymers, it has been suggested in U.S. Pat. No. 3,624,250 issued in 1971 to Carlson to incorporate in such copolymers small amounts of a copolymerizable vinyl monomer. It has also been suggested in the aforesaid Mueller et al. patent to incorporate into copolymers of ethylene and halogenated comonomers selected from the group consisting of tetrafluoroethylene, chlorotrifluoroethylene and mixtures thereof, a minor amount of 3,3,3-trifluoro-2-trifluoromethyl propene to improve the thermal stress-crack resistance of the copolymers. It would be desirable to provide a copolymer of ethylene and a halogenated comonomer selected from the group consisting of tetrafluoroethylene, chlorotrifluoroethylene and mixtures thereof having improved thermal stress-crack resistance without necessitating the addition of a termonomer which adds to the cost of the copolymer.

SUMMARY OF THE INVENTION

In accordance with the present invention, there are provided copolymers of from about 40 to about 60 mol percent ethylene and correspondingly from about 60 to about 40 mol percent of a halogenated comonomer selected from the group consisting of tetrafluoroethylene, chlorotrifluoroethylene, and mixtures thereof and containing high and low molecular weight components such that the following equations are satisfied:

$$\sum_{i=1}^{\infty} X_i \overline{M}w_i = f \cdot \overline{M}w, \text{ and} \quad (1)$$

$$0.02 \leq \frac{\overline{M}w \sum_{i=1}^{\infty} X_i}{\sum_{i=1}^{\infty} X_i \overline{M}w_i} \leq 0.6, \quad (2)$$

wherein $X_i$ represents the weight fraction of each high molecular weight component i;

$\overline{M}w$ represents the weight-average molecular weight of the copolymer;

$\overline{M}w_i$ represents the weight-average molecular weight of each component i;

$$\overline{M}w = \sum_{i=1}^{\infty} X_i \overline{M}w_i + \sum_{j=1}^{\infty} X_j \overline{M}w_j$$

wherein $X_j$ represents the weight fraction of each low molecular weight component j, and $\overline{M}w_j$ represents the weight-average molecular weight of each component j, and $$0.1 \leq f \leq 0.95.$$

Also in accordance with this invention, such copolymers are provided by a process which comprises contacting under polymerization conditions, ethylene, in an amount sufficient to provide the desired weight fraction of the high molecular weight component of the copolymer, with a weight excess of the halogenated monomer, conducting the polymerization reaction to provide a mixture of the copolymer and remaining monomer, adding a chain transfer agent to the mixture and contacting the mixture, under polymerization conditions, with an additional amount of ethylene sufficient to provide the desired weight fraction of the low molecular weight component of the copolymer.

In accordance with a preferred embodiment of this invention, copolymers of from about 40 to about 60 mol percent, preferably about 45 to about 55 mol percent, of ethylene and correspondingly from about 60 to about 40 mol percent, preferably about 55 to about 45 mol percent, of a halogenated conomomer selected from the group consisting of tetrafluoroethylene, chlorotrifluoroethylene and mixtures thereof are provided, which copolymers contain from about 0.5 to 40 weight percent of a high molecular weight fraction having a melt index, as hereinafter defined, of from about 0.0001 to 1.0. That is, such copolymers have a wider molecular weight distribution than copolymers of such comonomers which have heretofore been suggested. In particular, the copolymers preferably include on a weight basis from about 0.5 to about 40%, more preferably about 1 to about 25%, and most preferably about 3 to about 20% of a high molecular weight copolymer fraction which has a melt index of from about 0.0001 to about 1.0, preferably about 0.005 to about 0.5, most preferably about 0.005 to about 0.02. In this embodiment, the copolymers correspondingly contain from about 60 to about 99.5, more preferably from about 75 to about 99, and most preferably from about 80 to about 97, weight percent of a low molecular weight fraction which has a melt index in the range of about 3 to 3000, preferably about 10 to 1000 and most preferably about 30 to 550. The overall melt index of the copolymer may be in the range of about 0.1 to 50, preferably about 0.5 to 40 most preferably about 1 to 35.

BRIEF DESCRIPTION OF THE DRAWINGS

The FIG. of the drawing is a graph of the molecular weight distribution of two representative equimolar ethylenechlorotrifluoroethylene copolymers, one containing a high molecular weight fraction (curve A) and the other not containing a high molecular weight fraction (curve B).

DESCRIPTION OF THE PREFERRED EMBODIMENTS

The copolymers of the present invention may be prepared using known polymerization methods such as are described in the Mueller et al. and Carlson patents (except for the addition of the termonomers therein disclosed), modified as described below. These methods include the copolymerization of ethylene with chlorotrifluoroethylene in a stirred aqueous medium at superatmospheric pressure using benzoyl peroxide as catalyst; using a radiation catalyst at 0° C; by bulk polymerization at temperatures between about −80 to +50° C using oxygen-activated alkyl boron or other boroncontaining catalysts. Preferably, copolymers containing chlorotrifluoroethylene alone or also containing tetrafluoroethylene are prepared by batchwise bulk copolymerization of the monomers at temperatures between about −20 and −20° C, at superatmospheric pressure in an agitated pressure vessel, preferably in the presence of inert chlorofluorocarbon solvent, by charging the vessel with liquid chlorofluoroethylene monomer and/or tetrafluoroethylene monomer and admitting gaseous ethylene into the vessel, using polymerization initiators effective at such temperatures, such as organic peroxides (e.g. trifluoroacetyl peroxide). For copolymers of ethylene and tetrafluoroethylene, similar conditions can be employed except that the temperature preferably ranges from about 30 to 85° C. The copolymers of the present invention may also be prepared by polymerization in aqueous suspension or dispersion using known techniques.

In further accordance with the preferred embodiment of this invention, a pressure vessel is charged with the appropriate liquid monomer(s) and the requisite amount of ethylene gas calculated to provide the approximately desired weight fraction of the high molecular weight portion of the copolymer is admitted into the pressure vessel, after which a chain transfer agent, such as chloroform, heptane, cyclohexane or the like is added. Alternatively, a small additional amount of chain transfer agent may initially be present. Thereafter, the remainder of the ethylene to be reacted as admitted into the vessel. The chain transfer agent serves to terminate the reaction with respect to formation of the high molecular weight portion of the copolymer and results in the formation of the low molecular weight portion which has a reduced chain length.

The high molecular weight portion of the copolymer may comprise one or more high molecular weight components. The sum of the products of each weight fraction of a high molecular weight component times the weight-average molecular weight of that component is a function of the weight-average molecular weight of the copolymer, as is expressed in the following equation:

$$\sum_{i=1}^{\infty} X_i \overline{M}w_i = f \cdot \overline{M}w_t \qquad (1)$$

wherein $i$ represents each high molecular weight component, $X_i$ represents the weight fraction of each high molecular weight component, $\overline{M}w_i$ represents the weight-average molecular weight of each component i, $\overline{M}w$ represents the total weight-average molecular weight of the copolymer and $$0.1 \leq f \leq 0.95.$$

Preferably $f$, which is the fraction of the weight-average molecular weight of the blend contributed by the high molecular weight components, is greater than or equal to 0.15 and less than or equal to 0.85, most preferably greater than or equal to 0.2 and less than or equal to 0.8. If f is less than 0.1, no significant advantage is noticed in stress-crack resistance. If $f$ is more than 0.95, a uniform melt blend cannot be obtained due to the large difference in melt viscosities between the high and low molecular weight components.

In addition, the low molecular weight portion of the copolymer may also comprise one or more low molecular weight components. Thus, the weight-average molecular weight of the polymer is given by the equation:

$$\overline{M}w = \sum_{i=1}^{\infty} X_i \overline{M}w_i + \sum_{j=1}^{\infty} X_j \overline{M}w_j \qquad (2)$$

wherein $j$ represents each low molecular weight component, $X_j$ represents the weight fraction of each low molecular weight component and $\overline{M}w_j$ represents the weight-average molecular weight of each component j.

Moreover, the ratio of the weight-average molecular weight of the copolymer to the weight-average molecular weight of the high molecular weight components of the copolymer is as follows:

$$0.02 \leq \frac{\overline{M}w}{\left\{ \dfrac{\sum_{i=1}^{\infty} X_i \overline{M}w_i}{\sum_{i=1}^{\infty} X_i} \right\}} \leq 0.6 \qquad (3)$$

The ratio can also be expressed as:

$$\frac{\overline{M}w \sum_{i=1}^{\infty} X_i}{\sum_{i=1}^{\infty} X_i \overline{M}w_i} \qquad (4)$$

Preferably this ratio is greater than or equal to 0.04 and less than or equal to 0.5 and most preferably is greater than or equal to 0.08 and less than or equal to 0.4.

If this ratio is less than 0.02, a uniform melt blend cannot be obtained due to the large difference in melt viscosities between the high and low molecular weight components, whereas if the ratio is more than 0.6, no significant advantage in stress-crack resistance is noticed.

For more than two molecular weight components, the high molecular weight components are defined as the highest molecular weight component and any member of the next lower components, in descending order of molecular weight, such that any combination of all of the high molecular weight components satisfy equations 1 and 3.

This can be illustrated by assuming the following hypothetical molecular weight components of a copolymer: one component of 350,000 weight-average molecular weight, another of 300,000, a third of 200,000 and a fourth of 50,000. The high molecular weight components include (a) the 350,000 component; (b) may include the 300,000 component if, in combination with the 350,000 component, equations 1 and 3 are satisfied; (c) may also include the 200,000 component if, in combination with both of the 350,000 and 300,000 components, equations 1 and 3 are satisfied and (d) does not include the lowest molecular weight component, 50,000.

In a preferred embodiment of this invention, the copolymer comprises a single high molecular weight component and a single low molecular weight component and the total melt index of the copolymer is between about 0.1 to 50, preferably about 0.5 to 40 and more preferably about 1 to 35. In this case, the high molecular weight fraction has a melt index of about 0.0001 to 1.0, preferably about 0.005 to 0.5 and more preferably about 0.005 to 0.02. Correspondingly, the low molecular weight fraction has a melt index in the range of about 3 to 3000, preferably about 10 to 1000, and most preferably 30 to 550. The term "melt index" as used herein refers to the amount, in grams, of the copolymer that can be forced through a 0.0825 inch orifice when subjected to a 2160 gram force in 10 minutes at 275° C. (ASTM D-1238).

The relationship between the melt index and the weightaverage molecular weight for various polymers and copolymers is known or can be determined. The relationship for ethylene-chlorotrifluoroethylene copolymers is given as follows:

$$\overline{M}w = \frac{133,000}{MI^{0.27}} \quad (5)$$

wherein Mw is the weight-average molecular weight and MI is the melt index. The melt index of the high molecular weight portion of the copolymer can be determined from the following equation by measuring the melt indices of the low molecular weight portion and the overall copolymer:

$$MI_H{}^{0.27} = \frac{X_H}{\frac{1}{MI^{0.27}} - \frac{(1 - X_H)}{MI_L{}^{0.27}}} \quad (6)$$

wherein $MI_L$ is the melt index of the low molecular weight portion; $MI_H$ is the melt index of the high molecular weight portion; MI is the overall melt index of the copolymer and $X_H$ is the weight fraction of the high molecular weight portion. $MI_L$ may be estimated from the amount of chain transfer agent employed based upon polymerization reactions for the copolymers not containing a high molecular weight fraction.

The copolymers of this invention exhibit excellent high temperature stress-crack resistance as measured by the following stress-crack test.

The copolymer is first coated onto a steel plaque, approximately 2 × 4 × ¼ inch by heating the plaque to 340° C. and then dipping it several times into a fluidized bed of the powdered copolymer of particle size about 200 microns. The powder which adheres to the plaque is flowed out to form a smooth coating by heating at about 290° C. for about 10 minutes, followed by cooling.

The stress-crack resistance of the copolymer coating can be measured by placing the plaque in an oven at successively higher temperatures for about 18 hours each, until cracks are found to occur in the coating. The initial test temperature is 130° C., and the temperature is raised about 10° C. for each successive trial. The temperature at which the first crack appears is the stress-crack temperature.

It has been also discovered that the stress crack resistance can be additionally enhanced by providing a copolymer in which chlorotrifluoroethylene and/or tetrafluoroethylene units are present in an amount of between about 52 to 60 mol percent and preferably between about 52 to 55 mol percent.

As stated above, the copolymers contain between about 40 and about 60 mol percent of ethylene units and correspondingly between about 60 and 40 mol percent of chlorotrifluoroethylene or tetrafluoroethylene units or mixtures thereof. By the term "mixtures thereof" is meant mixtures containing any desired amount of chlorotrifluoroethylene and tetrafluoroethylene. More preferably, the copolymers contain between about 45 and about 55 mol percent of ethylene units and correspondingly amounts of the other comonomer units amounting to a total of 100 mol percent.

The sole FIGURE is a graph, on log-log scale, of the molecular weight distribution of a representative equimolar ethylenechlorotrifluoroethylene copolymer of the present invention containing a high molecular weight fraction (curve A) and a similar copolymer which does not contain a high molecular weight fraction (curve B). In each case, the MI of the copolymer was 9.2. For the copolymer of curve A, $MI_H$ is 0.01, $X_H$ is 0.10 and $MI_L = 250$.

To further illustrate the present invention, the following non-limiting examples are given:

EXAMPLE 1

66 l deionized water were charged to a 40 gallon, glasslined reactor. After air evacuation, 19 l methanol and 11.3 kg chlorotrifluoroethylene were also charged to the reactor. At 10° C, and with agitation, sufficient ethylene was fed to bring the reactor pressure up to 170 PSIG. The reaction was initiated by the addition of 2.5g trichloroacetyl peroxide, and additional peroxide was added in 0.5g increments about every 6 minutes to maintain the polymerization. As the reaction proceeded, additional ethylene was continuously fed to the reactor to maintain a pressure of 170 PSIG. After 172g of the additional ethylene had been fed, 372g chloroform were charged. The total reaction time was 10.5 hours, or until 1.45 kg total additional ethylene was fed. After the copolymerization, the polymer was separated from the water-methanol solution by filtration and then dried. The yield was 10.1 kg. The melt index (MI) of the copolymer was 12. After melt blending for 5 minutes at 260° C, the MI was unchanged.

Based on the relative amounts of ethylene added before and after the chloroform addition, the copolymer had 12 wt. % high molecular weight portion (estimated $\overline{M}w$ of 460,000 and MI of 0.01) and 88 wt. % of low molecular weight portion of MI 500 (estimated $\overline{M}w$ of 25,000). The product contained 50.3 mol % chlorotrifluoroethylene units.

EXAMPLE 2

The polymerization was carried out as in Example 1, except that 375g chloroform were charged after 218g of the additional ethylene had been fed. The total reaction time was 5.3 hours, or until 1.37 kg total additional ethylene was fed. The yield was 96 kg with a MI of 3.5. After melt blending the MI was unchanged. The product had 15.9 wt. % high molecular weight portion (estimated $\overline{M}w$ of 460,000) and 84.1 wt. % of low molecular weight portion of MI 470 (estimated $\overline{M}w$ of 25,000). The product contained 51.1 mol % chlorotrifluoroethylene.

EXAMPLE 3

The polymerization was carried out as in Example 1, except that 232g chloroform were charged after 102g of the additional ethylene had been fed. The total reaction time was 11 hours, or until 1.50 kg total additional ethylene was fed. The yield was 10.6 kg with a MI of 25. After melt blending the MI was unchanged. The product had 6.8 wt. % high molecular weight portion (estimated $\overline{M}w$ of 460,000) and 93.2 wt. % of low molecular weight portion of MI 78 (estimated $\overline{M}w$ of 41,000). The product contained 50.8 mol % chlorotrifluoroethylene units.

EXAMPLE 4

The polymerization was carried out as in Example 1, except that 189g chloroform were charged after 59g of the additional ethylene had been fed. The total reaction time was 10.5 hours, until 1.56 kg additional ethylene had been fed. The yield was 10.9 kg with a MI of 18. After melt blending the MI was unchanged. The product had 3.8 wt. % high molecular weight portion (estimated $\overline{M}w$ of 460,000) and 96.2 wt. % of low molecular weight portion of MI 40 (estimated $\overline{M}w$ of 49,000). The product contained 50.5 mol % chlorotrifluoroethylene units.

EXAMPLE 5

The polymerization was carried out as in Example 1 except that the total pressure was maintained at a total of 125 PSIG by appropriate ethylene feed. 296g chloroform were charged to the reactor after 173g of the additional ethylene had been fed. The total reaction time was 11 hours, until 1.65 kg additional ethylene had been fed. The yield was 10.9 kg with a MI of 13. After melt blending the MI was 6.3. The product had 10.5 wt. % high molecular weight portion (estimated $\overline{M}w$ of 460,000) and 89.5% of low molecular weight portion of MI 270 (estimated $\overline{M}w$ of 29,000). The mol percent chlorotrifluoroethylene units in the polymer was 52.1.

EXAMPLE 6

A copolymer product was prepared following the procedure of Example 1, except that the temperature was 20° C. and the pressure was 155 psig. The copolymer contained 53.5 mol % chlorotrifluoroethylene, 10 weight % high molecular weight portion (estimated $\overline{M}w$ of 460,000) and 90% of a low molecular weight portion of MI of 100. The MI of the product was 11.3; after melt blending it was 6.8.

EXAMPLE 7 (Comparative)

The polymerization was carried out as in Example 1 except that 156 g chloroform were charged to the reactor before the catalyst addition was made. After 1.41 kg additional ethylene had been fed, the reaction was terminated (5.5 hours). The yield was 9.9 kg and the MI was 13. The product contained 50.5 mol % chlorotrifluoroethylene units.

The products of Examples 1–7 were coated onto steel plaques in accordance with the stress-crack test described above (coating thickness of about 10 mils) and placed in an oven at successively higher temperatures for about 18 hours each. The temperatures at which the coated plaques exhibited noticeable stress-cracks are shown in Table I.

The products were also subjected to high temperature elongation tests at 180° C in accordance with ASTM D-1708. The results are also shown in Table I.

TABLE I

| Example | Stress-Crack Temperature, C | % High Mw | Melt Index | Normal Elong. Percent | Actual Elong. % | % Increase Due to High Molecular Wt. portion | Mol % CTFE |
| --- | --- | --- | --- | --- | --- | --- | --- |
| 1 | 175 | 12 | 12 | 27 | 62 | 130 | 50.3 |
| 2 | — | 15.9 | 3.5 | 49 | 90 | 84 | 51.1 |
| 3 | 170 | 6.8 | 25 | 19 | 34 | 81 | 50.8 |
| 4 | 160 | 3.8 | 18 | 22 | 35 | 62 | 50.5 |
| 5 | 180 | 10.5 | 13 | — | — | — | 52.1 |
| 6 | 200 | 10 | 11.3 | 20 | 40 | 100 | 53.5 |
| 7 | 160 | 0 | 13 | 26 | — | — | 50.5 |

It can be seen from Table I that a copolymer of ethylenechlorotrifluoroethylene having a normal molecular weight distribution, that is, containing no high molecular weight fraction as herein disclosed, exhibited stress-cracks at only 160° C (Example 7). In comparison, when the copolymer contained only about 7% by weight of a high molecular weight fraction (MI of 0.01), the stress-crack temperature is raised to 170° C (Example 3) and when the copolymer contained 12% by weight of the high molecular weight fraction, the stress-crack temperature was further raised to 175° C (Example 1). Furthermore, when the copolymer contained 53.5 mol % chlorotrifluoroethylene units and had a high molecular weight fraction of 10% by weight (Example 6), the copolymer did not exhibit stress-cracks up to 200° C.

Table I also demonstrates the improved stress-crack resistance of the copolymers of this invention in terms of elongation at 180° C. As shown, the incorporation of about 4 to 16% by weight of a high molecular weight fraction increases the elongation by about 62 to 130% over normal copolymers having the same overall melt index.

EXAMPLE 8

72 l deionized water were charged to a 40 gallon, glasslined reactor. After air evacuation, 9 l of 1,1,2-trifluoro-1,2,2-trichloroethane and 4 cc chloroform were also charged to the reactor. At 20° C. and with agitation the reactor was pressurized successively with nitrogen to 50 psig, with tetrafluoroethylene to 134 psig and with ethylene to 170 psig. The reaction was initiated by the addition of 4 g trichloroacetyl peroxide, and additional peroxide was added in 0.5 g increments about every 7 minutes to maintain the polymerization. Tetrafluoroethylene and ethylene were fed continuously to the reactor in a 1:1 mol ratio to maintain the total reaction pressure of 170 psig. After the total weight of the tetrafluoroethylene and ethylene fed equaled 1.0 lb., another 44cc of chloroform were charged to the reactor and the reaction was continued until a total of 10 lbs. of the monomers had been fed continuously. The resulting copolymer contained 10% by weight of a high molecular weight portion and 90% by weight of a low molecular weight portion. The overall melt index was 14 (measured at 302° C.). The elongation of the copolymer at 180° C. was 11.5% as opposed to an elongation at 180° C. of 8% for a copolymer prepared by a similar procedure except that 28cc of chloroform was added at the beginning of polymerization.

The copolymers of the present invention exhibit outstanding mechanical, electrical and chemical properties at high temperatures in addition to their high temperature stresscrack resistance. As such, they are particularly suitable for making a variety of useful articles, such as valves, gaskets, pipes, wire and cable insulation, sheets and films. They can be coated onto many different substances by conventional processes, such as powder or fluidized bed coating. An especially advantageous use is in insulation coatings or jackets for wires and cables.

The copolymers may contain conventional additives, such as heat stabilizers, fillers, reinforcing agents, including glass fibers and the like, pigments, etc. as is suitable for specific applications. For example, the stabilizing systems described in U.S. Pat. No. 3,745,145 to Khattab et al. and U.S. Pat. No. 3,773,698 to Khattab, issued in 1973, may be employed.

It is to be understood that variations and modifications of the present invention may be made without departing from the scope of the invention. It is also to be understood that the scope of the invention is not to be interpreted as limited to the specific embodiment disclosed herein, but only in accordance with the appended claims when read in light of the foregoing disclosure.

I claim:

1. Copolymers of from about 40 to about 60 mol percent ethylene and correspondingly from about 60 to about 40 mol percent of a halogenated comonomer selected from the group consisting of tetrafluoroethylene, chlorotrifluoroethylene and mixtures thereof and containing high and low molecular weight components of said copolymers such that equations (1) and (2) are satisfied:

$$\sum_{i=1}^{\infty} X_i \overline{M}w_i = f \cdot \overline{M}w, \text{ and} \qquad (1)$$

$$0.02 \leq \frac{\overline{M}w \sum_{i=1}^{\infty} X_i}{\sum_{i=1}^{\infty} X_i \overline{M}w_i} \leq 0.6, \qquad (2)$$

wherein
$X_i$ represents the weight fraction of each high molecular weight component i,
$\overline{M}w$ represents the weight-average molecular weight of the copolymer,
$\overline{M}w_i$ represents the weight-average molecular weight of each component i, $$\overline{M}w = \sum_{i=1}^{\infty} X_i \overline{M}w_i + \sum_{j=1}^{\infty} X_j \overline{M}w_j$$

wherein
$X_j$ represents the weight fraction of each low molecular weight component j, and
$\overline{M}w_j$ represents the weight-average molecular weight of each component j, and
$0.1 < f < 0.95$, the high molecular weight components having a weight-average molecular weight, expressed in terms of melt index, of from about 0.0001 to 1.0 and the low molecular weight components having a weight-average molecular weight, expressed in terms of melt index, of from about 3 to 3000, and therefore wherein said copolymers contain from 0.2 to 57 weight percent of said high molecular weight components and from 99.8 to 43 weight percent of said low molecular weight components.

2. Copolymers in accordance with claim 1 containing about 0.5 to about 40 weight percent of a high molecular weight component which has a melt index of from about 0.0001 to 1.0 and correspondingly about 99.5 to about 60 weight percent of a low molecular weight component having a melt index of about 3 to 3000.

3. Copolymers in accordance with claim 2 wherein said halogenated copolymer is chlorotrifluoroethylene.

4. Copolymers in accordance with claim 3 containing from about 1 to about 25 weight percent of a high molecular weight component which has a melt index of from about 0.005 to about 0.5.

5. Copolymers in accordance with claim 4 wherein said high molecular weight fraction has a melt index in the range of about 0.005 to about 0.2.

6. Copolymers in accordance with claim 5 containing from about 45 to about 55 mol percent of ethylene and correspondingly from about 55 to about 45 mol percent of chlorotrifluoroethylene.

7. Copolymers in accordance with claim 3 containing from about 52 to about 55 mol percent of chlorotrifluoroethylene and correspondingly from about 48 to about 45 mol percent of ethylene.

8. Copolymers in accordance with claim 1 wherein $0.2 \leq f \leq 0.8$ and $$0.08 \leq \frac{\overline{M}w \sum_{i=1}^{\infty} X_i}{\sum_{i=1}^{\infty} X_i \overline{M}w_i} \leq 0.6$$

9. Copolymers of from about 40 to 60 mol percent ethylene and correspondingly from about 60 to 40 mol percent of a halogenated comonomer selected from the group consisting of tetrafluoroethylene, chlorotrifluoroethylene and mixtures thereof and containing from about 0.5 to about 40 weight percent of a high molecular weight fraction which has a melt index of from about 0.0001 to 1.0 and from about 60 to about 99.5 weight percent of a low molecular weight fraction having a melt index of from about 3 to 3000.

10. Copolymers in accordance with claim 9 wherein said halogenated comonomer is chlorotrifluoroethylene.

11. Copolymers in accordance with claim 10 containing from about 1 to about 25 weight percent of a high molecular weight fraction which has a melt index of from about 0.005 to about 0.5.

12. Copolymers in accordance with claim 11 in which said high molecular weight fraction has a melt index in the range of about 0.005 to about 0.2 and said low molecular weight fraction has a melt index of about 30 to 550.

13. Copolymers in accordance with claim 12 containing from about 45 to about 55 mol percent of ethylene and correspondingly from about 55 to about 45 mol percent of chlorotrifluoroethylene.

14. Copolymers in accordance with claim 9 containing from about 52 to about 55 mol percent of said halogenated comonomer and correspondingly from about 48 to about 45 mol percent of ethylene.

15. Copolymers in accordance with claim 14 wherein said halogenated comonomer is chlorotrifluoroethylene.

16. Copolymers in accordance with claim 15 containing from about 1 to about 25 weight percent of a high molecular weight fraction having a melt index in the range of about 0.005 to about 0.5.

17. Copolymers in accordance with claim 9 wherein said halogenated comonomer is tetrafluoroethylene.

18. A process of preparing stress-crack resistant copolymers of from about 40 to about 60 mol percent ethylene and correspondingly from about 60 to about 40 mol percent of a halogenated comonomer selected from the group consisting of tetrafluoroethylene, chlorotrifluoroethylene and mixtures thereof, said process comprising forming a copolymer containing a high molecular weight component present in a desired weight fraction and having a melt index in the range of about 0.0001 to 1.0 and a low molecular weight component having a melt index in the range of about 3 to 3000 by contacting under polymerization conditions ethylene, in an amount sufficient to provide the desired weight fraction of said high molecular weight component, with a weight excess of a halogenated monomer selected from the group consisting of tetrafluoroethylene, chlorotrifluoroethylene, and mixtures thereof, conducting said polymerization to provide said high molecular weight component of said copolymer in a reaction mixture, adding a chain transfer agent to said mixture after formation of said high molecular weight component and contacting said mixture, said polymerization conditions, with an additional amount of ethylene to provide said low molecular weight component, wherein said high and low molecular weight components are chosen such that the following equations are satisfied:

$$\sum_{i=1}^{\infty} X_i \overline{M}w_i = f \cdot \overline{M}w, \text{ and} \quad (1)$$

$$0.02 \leq \frac{\overline{M}w \sum_{i=1}^{\infty} X_i}{\sum_{i=1}^{\infty} X_i \overline{M}w_i} \leq 0.6, \quad (2)$$

wherein
$X_i$ represents the weight fraction of each high molecular weight component i,
$\overline{M}w$ represents the weight-average molecular weight of the copolymer.
$\overline{M}w_i$ represents the weight-average molecular weight of each component i, $$\overline{M}w = \sum_{i=1}^{\infty} X_i \overline{M}w_i + \sum_{j=1}^{\infty} X_j \overline{M}w_j$$

wherein
$X_j$ represents the weight fraction of each low molecular weight component j, and
$\overline{M}w_j$ represents the weight-average molecular weight of each component j, and
$0.1 \leq f \leq 0.95$,
and therefore wherein said copolymers contain from 0.2 to 57 weight percent of said high molecular weight component and from 99.8 to 43 weight percent of said low molecular weight component.

19. The process of claim 18 wherein ethylene in the form of a gas is introduced into a pressure vessel containing said halogenated monomer in liquid form.

20. The process of claim 18 wherein said monomer is chlorotrifluoroethylene.

21. The process of claim 20 wherein said chain transfer agent is chloroform.

22. The process of claim 18 wherein said monomer is tetrafluoroethylene.

23. The process of claim 18 wherein said copolymer comprises from about 0.5 to about 40 weight percent of said high molecular weight component and from about 60 to about 99.5 weight percent of said low molecular weight component.

* * * * *

UNITED STATES PATENT OFFICE
CERTIFICATE OF CORRECTION

Patent No. 4,020,253          Dated     April 26, 1977

Inventor(s) Stephen R. Schulze

It is certified that error appears in the above-identified patent and that said Letters Patent are hereby corrected as shown below:

Column 2, line 61, after "40" insert --and--.

Column 3, line 21, "-20 and -20°C," should read ---20 and +20°C, --.

Column 6, line 38, "glasslined" should read --glass-lined--.

Column 8, line 59, "glasslined" should read --glass-lined--.

Column 9, line 18, "stresscrack" should read --stress-crack--.

Column 11, line 46, "said polymeri-" should reas --under polymeri---.

Column 12, line 17, "." should be --,--.

Signed and Sealed this

Tenth Day of January 1978

[SEAL]

Attest:

RUTH C. MASON  
Attesting Officer

LUTRELLE F. PARKER  
Acting Commissioner of Patents and Trademarks